(No Model.)
J. CONNOR.
PIPE COUPLING.
No. 296,678. Patented Apr. 8, 1884.
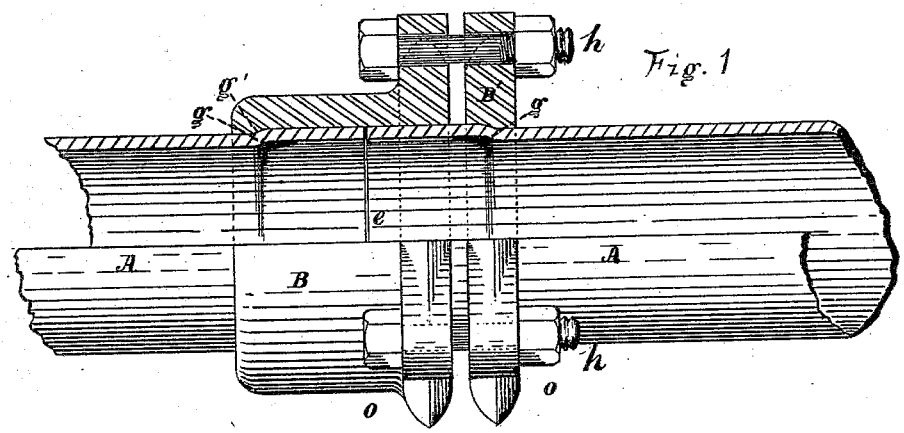
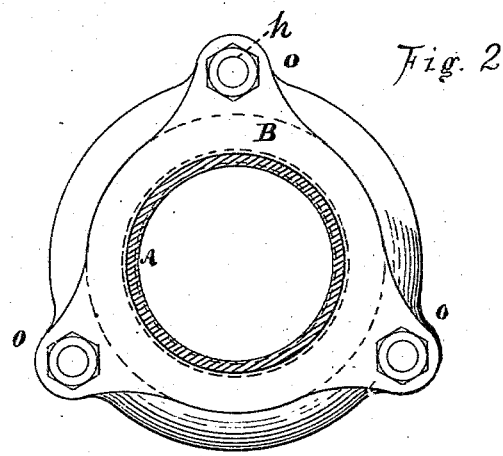
Witnesses.
William Wolfong
Samuel Mann
Inventor.
Joseph Connor

UNITED STATES PATENT OFFICE.

JOSEPH CONNOR, OF PHILADELPHIA, PENNSYLVANIA.

PIPE-COUPLING.

SPECIFICATION forming part of Letters Patent No. 296,678, dated April 8, 1884.

Application filed May 12, 1883. (No model.)

*To all whom it may concern:*

Be it known that I, JOSEPH CONNOR, of Philadelphia, in the county of Philadelphia and State of Pennsylvania, have invented a new and useful Improvement in Pipe-Couplings, which improvement is fully set forth in the following specification and accompanying drawings.

My improvement relates to that class of inventions known as "pipe-couplings," and has for its object the more perfect jointing of the sections of the pipes, so as to withstand greater strains, be less liable to leak, and whenever repairs are needed, to avoid the necessity of turning the pipe around in order to tighten it or unscrew it from a threaded socket.

I am aware that pipe-couplings have been known with pipes having flanges on their meeting ends and a cap fitting against one of the flanges and a band fitting against the other, with engaging screw-threads on cap and band for holding the pipes together, and I lay no claim to such construction.

My invention, as constructed and applied, will be fully understood by reference to the following specification and claim.

In the drawings, Figure 1 is a longitudinal part sectional and part full view. Fig. 2 is an end view.

Like letters have reference to similar parts.

A A, Fig. 1, are two pieces of pipe abutting against a soft-metal ring, as shown at $e$. The ends of the pipes are greater on their outer periphery than the body of the pipe, so as to form shoulders $g$ $g$. This shoulder may be made by the expansion of the ends of the pipes or by welding on a band, or it may be made by the process known as "upsetting."

B B' are cast-iron pieces, whose inner peripheries conform to the peripheries of the outside of the ends of the pipes, so that they will be held in their places by the shoulder $g$ $g$. By tightening up the bolts $h$ $h$ $h$, Fig. 2, the butt-ends of the pipes are drawn tightly against the soft-metal ring $e$, making a tight joint.

It will thus be seen that I make my joint by the formation of shoulders near the outer ends of the pipes, having first put on the pipes the parts B B', which are provided with shoulders on their inner diameters. The ends of the pipes are parallel with the axis of the pipes, and turned true, so as to fit tightly into the cylinder B, the whole being clamped together by the bolts $h$.

The portion B of the coupling is long enough to cover the joint made by the meeting ends of the pipes and fit snugly over a part of the ends of both pipes, and make a complete and close-fitting cover therefor.

Having thus described my invention, I claim as new and desire to secure by Letters Patent—

A coupling for pipes, consisting of the ends of the pipes to be joined, enlarged for a short distance, so as to form the shoulders $g$, and plane enlarged portions between said shoulders and the ends of the pipes, and the coupling-pieces B and B', and means for uniting them, said couplings being provided with interior shoulders to take hold of the shoulders $g$, and one of said portions of coupling being of sufficient length to cover the joint at the meeting ends of the pipes, substantially as set forth.

JOSEPH CONNOR.

Witnesses:
 JOHN MELLON,
 ALFRED WERNER.